United States Patent
Rajanna et al.

(10) Patent No.: US 12,019,617 B2
(45) Date of Patent: Jun. 25, 2024

(54) DATA QUALITY ENFORCEMENT AS A SERVICE INVOKED USING DESCRIPTIVE LANGUAGE

(71) Applicant: Upstart Network, Inc., San Mateo, CA (US)

(72) Inventors: Uday Rajanna, Benicia, CA (US); Yifan Gu, San Mateo, CA (US); Benjamin Cohen, San Francisco, CA (US); Puneet Bysani, Martinez, CA (US); Lakshmi Ranjani Venkateswaran, Palo Alto, CA (US)

(73) Assignee: Upstart Network, Inc., San Mateo, CA (US)

( * ) Notice: Subject to any disclaimer, the term of this patent is extended or adjusted under 35 U.S.C. 154(b) by 80 days.

(21) Appl. No.: 17/828,835

(22) Filed: May 31, 2022

(65) Prior Publication Data

US 2023/0385266 A1   Nov. 30, 2023

(51) Int. Cl.
  *G06F 16/00*    (2019.01)
  *G06F 16/215*   (2019.01)
  (Continued)

(52) U.S. Cl.
  CPC ........ *G06F 16/2365* (2019.01); *G06F 16/215* (2019.01); *G06F 16/2358* (2019.01); *G06F 16/28* (2019.01)

(58) Field of Classification Search
  CPC . G06F 8/60; G06F 9/451; G06F 16/93; G06F 16/9535; G06F 21/57;
  (Continued)

(56) References Cited

U.S. PATENT DOCUMENTS 7,073,174 B2   7/2006 Volkoff et al.
10,983,963 B1  4/2021 Venkatasubramanian et al.
(Continued)

*Primary Examiner* — Shyue Jiunn Hwa
(74) *Attorney, Agent, or Firm* — Baker Botts L.L.P.

(57) ABSTRACT

A computer-implemented method executed using a first networked computer and comprising receiving a digitally stored workflow pattern that specifies at least an input data source, a data transformation process, an output data destination, a data quality assertion and a data quality source; the workflow pattern comprising a structured plurality of name declarations and value specifications that are human readable and machine readable; the data transformation process specified in the workflow pattern including one or more references to processing logic, a processing logic source outside the workflow pattern at which the processing logic is stored, and one or more available process engines that are capable of processing the processing logic; machine parsing the workflow pattern and dividing the workflow pattern into a plurality of execution units, each execution unit being associated with a particular process engine among the one or more available process engines; accessing the input data source specified in the workflow pattern and loading at least a portion of data from the input data source into main memory; accessing the processing logic source at a second networked computer and loading a copy of the processing logic specified in the workflow pattern from the second networked computer; for each of the execution units, selecting a particular process engine among the plurality of available process engines, calling the particular process engine, programmatically providing access to the portion of data and the copy of the processing logic, and receiving output data that has been created by the particular process engine after transforming the portion of data; translating the data quality assertion into a data quality request and automatically forwarding the data quality request to the data quality source at a third computer, the data quality request (Continued)

comprising the data quality assertion, and receiving a response to the request that specifies whether the output data conforms to the data quality assertion.

26 Claims, 7 Drawing Sheets

(51) Int. Cl.
*G06F 16/23* (2019.01)
*G06F 16/28* (2019.01)

(58) Field of Classification Search
CPC . G06F 40/117; G06F 8/38; G06F 8/71; G06F 8/73; G06F 9/547; G06F 11/0739; G06F 11/0751; G06F 11/3684; G06F 11/3688; G06F 11/3692; G06F 12/0831; G06F 16/3344; G06F 16/35; G06F 16/51; G06F 16/5846; G06F 16/957; G06F 18/232; G06F 18/23213; G06F 21/12; G06F 21/45; G06F 21/64; G06F 21/645; G06F 40/109; G06F 40/134; G06F 40/157; G06F 40/211; G06F 40/232; G06F 40/253; G06F 40/268; G06F 40/284; G06F 8/34; G06F 8/427; G06F 9/455; G06F 9/4843; G06F 9/505; G06F 16/2379; G06F 16/27; G06F 9/466; G06F 16/182; G06F 16/1865; G06F 16/23; G06F 16/2365; G06F 16/24; G06F 16/2457; G06F 16/951; G06F 18/2148; G06F 18/2155; G06F 21/105; G06F 21/602; G06F 30/27; G06F 9/4806; G06F 9/4881; G06F 9/50; G06F 9/5016; G06F 9/541; G06F 18/22; G06F 18/23; G06F 9/543; G06F 17/16; G06F 17/18; G06F 9/3838

See application file for complete search history.

(56) References Cited

U.S. PATENT DOCUMENTS

| | | | |
|---|---|---|---|
| 2002/0046072 A1 | 4/2002 | Arai et al. | |
| 2008/0301685 A1* | 12/2008 | Thomas | G06Q 20/40 726/5 |
| 2009/0204471 A1 | 8/2009 | Elenbaas et al. | |
| 2012/0192143 A1* | 7/2012 | Elaasar | G06F 8/35 717/104 |
| 2013/0095864 A1* | 4/2013 | Marovets | G06Q 30/0239 455/466 |
| 2019/0305959 A1* | 10/2019 | Reddy | G06F 8/73 |
| 2022/0223292 A1* | 7/2022 | Devitt | G16H 20/70 |
| 2022/0327119 A1* | 10/2022 | Gasper | G06F 16/906 |
| 2023/0030187 A1* | 2/2023 | Shankar | G06F 9/5072 |

* cited by examiner

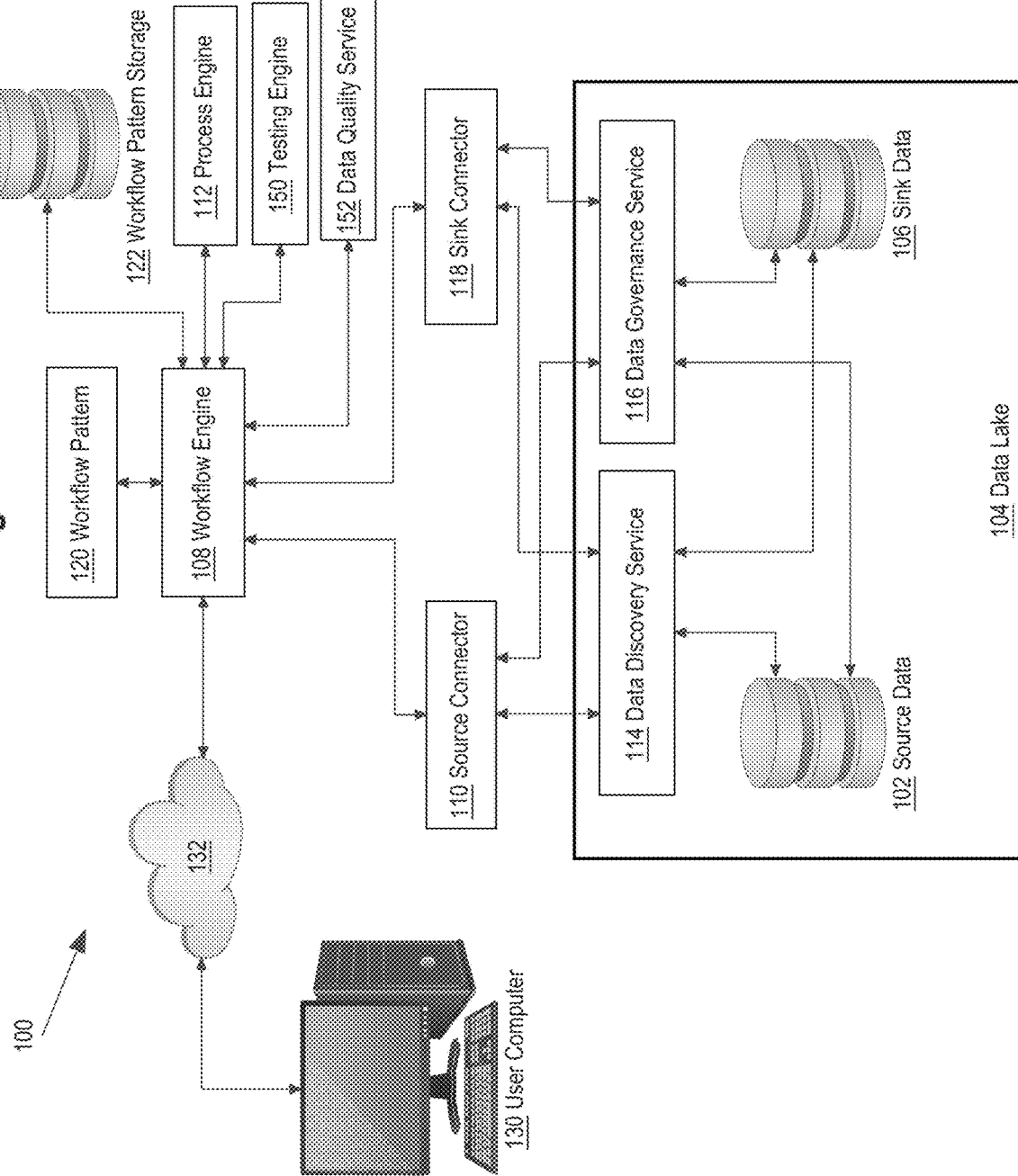

DATA QUALITY ENFORCEMENT AS A SERVICE INVOKED USING DESCRIPTIVE LANGUAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022 Upstart Network, Inc.

TECHNICAL FIELD

One technical field of the present disclosure is large-scale database systems and data engineering.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large-scale data processing systems can fundamentally involve receiving input data, executing transformations on the input data to form output data, and transmitting the output data to another system, a data storage device, and/or a client computing system. Transformations can be structured using multiple different computer programs or services that are serially arranged in a pipeline; the output from one element of the pipeline is fed as input to the next element in the pipeline, and each element implements a different data transformation. Data engineering is the technical discipline concerned with configuring, programming, or structuring the functional elements and building pipelines to execute the specific transformations that solve a particular problem or provide a particular result.

Conventionally, data engineering has involved developing customized or bespoke pipelines in response to user requests. Customized pipeline development involves a high degree of effort for each user request, and therefore it is not scalable to thousands or millions of user requests if they are received in small periods. Turnaround time is typically long, specialized data engineering skills are used, and centralized data governance may be unavailable or impossible. Data engineering work often is closely coupled to software development and machine learning work. Consequently, there is an acute need in the data engineering field for a way to self service and improve the efficiency by which data engineering pipelines are created.

SUMMARY

The appended claims may serve as a summary of the invention.

BRIEF DESCRIPTION OF THE DRAWINGS

In the drawings:

FIG. 1A illustrates a distributed computer system showing the context of use and principal functional elements with which one embodiment could be implemented.

DETAILED DESCRIPTION

Figure 1B:
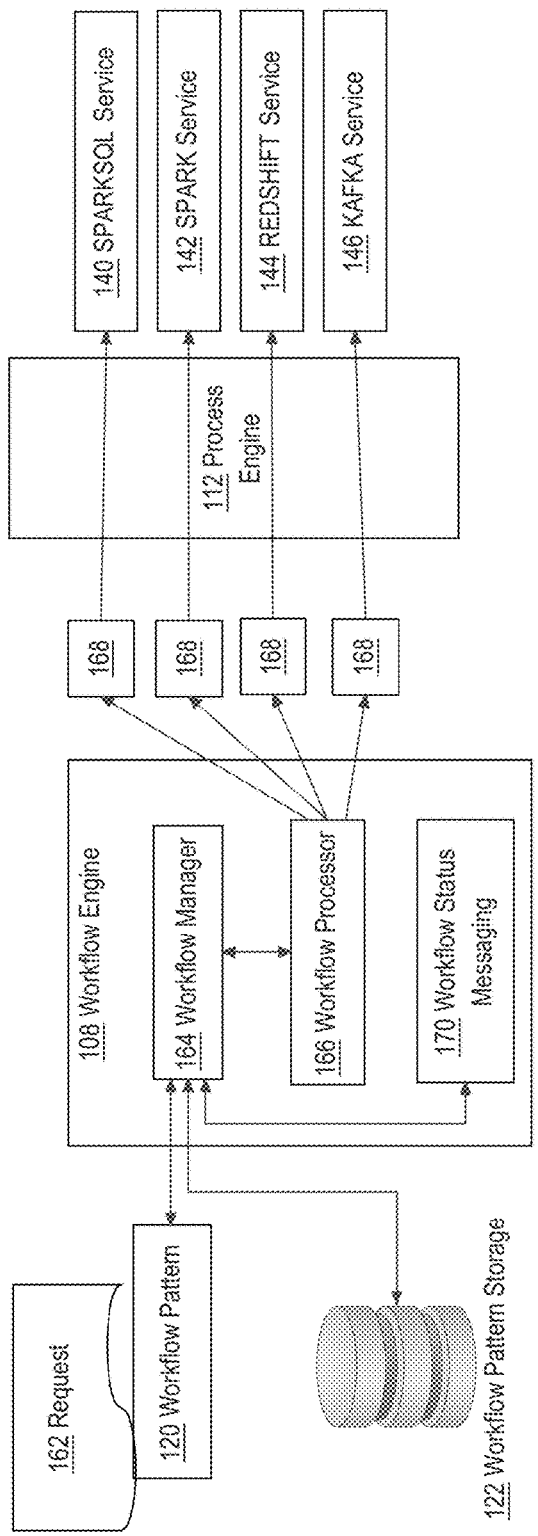
FIG. 1B illustrates details of the workflow engine of FIG. 1A and other functional elements with which the workflow engine interoperates.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview 1. General Overview Embodiments provide computer-implemented processes and algorithms by which an end user can define a data pipeline using a descriptive language. Embodiments provide a platform-as-a-service solution to allow users with data engineering requests to efficiently create new data pipelines responsive to the request. Or, data engineers can more quickly and efficiently define data pipelines by focusing primarily on operational issues rather than engineering. With both approaches, development time and testing cycles can be dramatically reduced. A centralized platform capable of self-service to allow developers and non-developers to create data pipelines using a descriptive language can substantially reduce the software development lifecycle and open pipeline definition to a broader class of users who lack specialized engineering education or experience. Embodiments can be implemented using microservices, thereby simplifying maintenance and enabling execution using multiple smaller computing instances. Embodiments can be programmed to automate the enforcement of quality controls and security controls as data moves into and out of a data lake. Embodiments can implement data quality as a service and data governance within a centralized platform.

Certain embodiments can be deployed within an enterprise to service the needs of enterprise users within the organization. Concurrently, the same system can be licensed for a specific field of use or a particular combination of computing, storage, and integration resources. In this manner, embodiments can both serve an organization and provide an inbound source of added revenue for the organization, helping cover costs of development.

In various embodiments, the disclosure encompasses the subject matter of the following numbered clauses:

1. A computer-implemented method executed using a first networked computer and comprising: receiving a digitally stored workflow pattern that specifies at least an input data source, a data transformation process, and an output data destination, the workflow pattern comprising a structured plurality of name declarations and value specifications that are human readable and machine readable, the data transformation process specified in the workflow pattern including one or more references to processing logic, a processing logic source outside the workflow pattern at which the processing logic is stored, and one or more available process engines that are capable of processing the processing logic; machine parsing the workflow pattern and dividing the workflow pattern into a plurality of execution units, each execution unit being associated with a particular process engine among the one or more available process engines; accessing the input data source specified in the workflow pattern and loading at least a portion of data from the input data source into main memory; accessing the processing logic source at a second networked computer and loading a copy of the processing logic specified in the workflow pattern from the second networked computer; for each of the execution units, selecting a particular process engine among the plurality of available process engines, calling the particular process engine, programmatically providing access to the portion of data and the copy of the processing logic, and receiving output data that has been created by the particular process engine after transforming the portion of data.

2. The method of clause 1, further comprising accessing the output data destination and storing the output data at the output data destination.

3. The method of clause 1, the workflow pattern specifying two or more workflows, each of the workflows specifying at least a particular input data source, a particular data transformation process, and a particular output data destination, in which the particular output destination of a first workflow among the two or more workflows references the particular data input of the second workflow among the two or more workflows, the first workflow and second workflow thereby being cross-referential; the method further comprising storing the output data associated with the first workflow transiently for use as input to the second workflow.

4. The method of clause 1, further comprising writing a message to an outbound event queue to report completion of the data transformations and to specify zero or more exceptions, errors, or notifications that have been received from the external services.

5. The method of clause 1, further comprising receiving the digitally stored workflow pattern that specifies the input data source as a network path to a partition of a data storage system and a source connector that specifies an input interface that is programmed to interoperate with the data storage system.

6. The method of clause 5, the data storage system comprising any of AMAZON S3, AMAZON REDSHIFT, or POSTGRES databases.

7. The method of clause 1, further comprising receiving the digitally stored workflow pattern that specifies the data transformation process as a process type that is associated in the workflow pattern with the processing logic source outside the workflow pattern at which the processing logic is stored and with the one or more available process engines.

8. The method of clause 7, the process type specifying a SPARKSQL packaged job.

9. The method of clause 1, further comprising receiving the digitally stored workflow pattern that specifies the output data destination as an association of specifications of: a network path to a relational database system, warehouse database, or topic in a streaming system; a sink connector that specifies an output interface that is programmed to interoperate with the system of the network path; and a queue identifier of an outbound message queue; the method further comprising writing a completion message to the outbound message queue specified by the queue identifier.

9A. The method of clause 9, in which the streaming system is APACHE KAFKA.

10. The method of clause 9, further comprising: receiving, in association with the output data that has been created by the particular process engine after transforming the portion of data, one or more exception messages that specify one or more exceptions, errors, or notifications arising from the transforming; writing, as part of the completion message, message content of the one or more exception messages.

11. A computer-implemented method executed using a first networked computer and comprising: receiving a digitally stored workflow pattern that specifies at least an input data source, a data transformation process, an output data destination, a data quality assertion and a data quality source; the workflow pattern comprising a structured plurality of name declarations and value specifications that are human readable and machine readable; the data transformation process specified in the workflow pattern including one or more references to processing logic, a processing logic source outside the workflow pattern at which the processing logic is stored, and one or more available process engines that are capable of processing the processing logic; machine parsing the workflow pattern and dividing the workflow pattern into a plurality of execution units, each execution unit being associated with a particular process engine among the one or more available process engines; accessing the input data source specified in the workflow pattern and loading at least a portion of data from the input data source into main memory; accessing the processing logic source at a second networked computer and loading a copy of the processing logic specified in the workflow pattern from the second networked computer; for each of the execution units, selecting a particular process engine among the plurality of available process engines, calling the particular process engine, programmatically providing access to the portion of data and the copy of the processing logic, and receiving output data that has been created by the particular process engine after transforming the portion of data; translating the data quality assertion into a data quality request and automatically forwarding the data quality request to the data quality source at a third computer, the data quality request comprising the data quality assertion, and receiving a response to the request that specifies whether the output data conforms to the data quality assertion.

12. The method of clause 11, the data quality assertion comprising an SQL-based data quality assertion.

13. The method of clause 11, the data quality source comprising any of AMAZON AWS ATHENA or GREAT EXPECTATIONS.

14. The method of clause 11, further comprising transmitting one or more alerts or notifications in the response to one or more of a log file, a governance metadata database, or an external logging service.

2. Structural & Functional Overview

2.1 Example Distributed Computer System Implementation

FIG. 1A illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of automated workflow processing with enforcement of data quality requirements. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1A, a data lake 104 comprises one or more relational databases, data clusters, object repositories, or other data repositories that include source data 102 and sink data 106. Each of the source data 102 and sink data 106 can comprise one or more tables or other storage elements of the data lake 104. For conceptual clarity, source data 102 represents input data to data transformations, and sink data 106 represents the transformed data resulting from the data transformations, but in some embodiments, the source data and sink data can be tables in the same database, database server, or repository and separate hardware or software systems are not required.

Access to source data 102 and sink data 106 is controlled using a data discovery service 114, which can be programmed to enforce access control lists or other security controls to regulate which user accounts, programs, systems, services, or computers can access the source data 102 and sink data 106. In one embodiment, access control lists, permissions, or other security controls can be determined automatically based upon parsing and interpreting elements of a workflow pattern 120. As described further in other sections herein, since a database identifier and table name are included in the workflow pattern 120, the workflow engine 108 and/or data governance service 116 can be programmed to parse the workflow pattern 120, determine a group owner of the specified database, and assign permissions to the group associated with the group owner. This approach can eliminate the manual assignment and control of access controls for datasets that are created by processing a workflow pattern 120.

Data lake 104 also can be programmed with a data governance service 116 that enforces controls on the quality, format, field values, or columns that can enter or leave the data lake 104 as part of source data 102 or sink data 106.

A user computer 130 can be communicatively coupled, directly or indirectly via one or more networks 132, to a workflow engine 108 that is programmed to support the definition and storage of one or more workflow patterns 120. The workflow pattern 120 can be stored in one or more relational database tables in workflow pattern storage 122 or as a flat file in the data lake 104. Optionally, workflow pattern storage 122 can enforce version controls or other native source control functions for workflow patterns 120. A completed workflow pattern 120 can be programmed to direct the execution of a process engine 112, which is programmed to execute data transformations of the source data 102 into the sink data 106, directly or indirectly via calls to other services, as further described. For purposes of illustrating a clear example, FIG. 1 shows a single process engine 112. Other embodiments can include any number of process engines 112, each having a unique identifier to enable invocation of one or more process engines or other services or systems as specified by the workflow pattern 120.

The workflow engine 108 can be programmed to obtain access to the source data 102 via a source connector 110, and to write to the sink data 106 via a sink connector 118. The source connector 110 and sink connector 118 can be programmed as adapters or interfaces to enable the process engine 112 use a single, consistent format to transmit read, write, create, or update requests, instructions, or queries, which the source connector and sink connector reformat, transform, or modify to match interfaces, query languages, or other interoperation requirements of the source data 102 and sink data 106.

A workflow pattern 120 can be defined in a series of human-readable digitally stored text statements according to a domain specific language (DSL). A workflow pattern 120 can be created and digitally stored via user computer 130 using a text editor, scripting language editor, or other electronic document preparation system. In an embodiment, each workflow pattern 120 specifies at least an input data source, a data transformation process, and an output data destination, the workflow pattern comprising a structured plurality of name declarations and value specifications that are human readable and machine readable, the workflow pattern including at least one reference to processing logic that is stored at a processing logic source outside the workflow pattern.

In a particular embodiment, a workflow pattern 120 can specify one or more input locations such as the source data 102; an input type for each of the one or more input locations; one or more data transformations or other processing logic; one or more output locations such as sink data 106 or a destination stream; an output type for each of the one or more input locations; a processing engine 112 to invoke; and one or more parameter values that identify and/or control how the process engine executes an element of a pipeline represented in the workflow pattern. Parameter values can be implemented using configuration strings. Two or more workflow patterns 120 can comprise a pipeline, or a single workflow pattern can define multiple transformations of a pipeline. The processing logic can be programmed or expressed in a general-purpose programming language and embedded in the workflow pattern 120 for parsing or interpretation at process engine 112. In some embodiments, natural language descriptions can be used to create data pipelines; in an embodiment, a workflow pattern could specify one or more natural language phrases, such as "ingest to data lake" and "land to redshift," with specified inputs, output locations and process logic. TABLE 1 illustrates an example workflow pattern 120, and the APPENDIX to this specification provides other examples:

TABLE 1

EXAMPLE WORKFLOW PATTERN

```
{
  workflows: [
    {
      workflow id: 120,
      schedule: {
        type: "cron/event",
        cron:"5 4 * * *",
        inbound event group: {
          event list: ["createobjevent",
          "objremovalevent"]
          event regex: ["*event", "partition
          yyyymmdd project"]
        }
      }
      input: {
        input source: "s3://bucket/partition1/" (could also be a
        db in postgres/mysql/redshift, topic in kafka, sftp, api)
          source connector: "s3/postgres/kafka/redshift"
      },
      process: {
        process type: "sparksql/sql/packaged job"
        process logic: {
          source: "project id: workflow id/git@github.com:
          teamupstart/nightly-
          etl.git/,s3://bucketl/partition2/nightly-etl.zip"
          source type: "workflow storage/git/s3"
        }
        process engine: "spark, kafka, redshift, pod"
      },
      output : {
        output destination: "s3://bucket/partition outl/" (RDS
        db, warehouse db, topic in kafka)
          sink connector: "s3, postgres, redshift, kafka"
          outbound event queue: "message2"
      },
      config : {
        connection type: "api adapter, sftp"
        rate limit: 20
        access : {
          authentication type: "password, mfa, token"
          secrets : ""
        }
      }
    }
  ]
}
```

As shown in Table 1, a workflow pattern can be created and stored as a digital electronic document in Yet Another Markup Language (YAML), JSON, or other script or programming language format, in a symbolic format that is both human readable and capable of machine parsing and transformation into executable instructions. In an embodiment, a workflow pattern includes keywords, tokens, and delimiters for the following elements, and specific values for each of the elements. In some embodiments, pipeline metadata can be configured using one or more of a reference to a data repository, such as a GITHUB link, and/or an identifier of a RESTful API endpoint. Furthermore, as previously described, in some embodiments, workflow engine 108 and/or data governance service 116 can be programmed to derive role based access controls automatically based on governance rules and/or metadata values that are specified in the workflow pattern.

Workflow identifier. A unique alphanumeric identifier for the workflow. It can facilitate version control.

Schedule specification. A declaration of a schedule on which the workflow should execute. A schedule can have a type of CRON, can be event-based, or can declare both CRON and event-based processing. When a CRON schedule type is specified, a UNIXTIME value indicates a time at which to execute the workflow. When event-based scheduling is declared, the schedule specification also declares a group of events for which the workflow engine should listen. The group can specify event names and a regular expression or REGEX for a plurality of events that are associated with a publisher, such as a project.

Input specification. A declaration of the input data sources from which data is obtained for transformation. The input specification includes an input source identifier and a source connector identifier. The input source identifier can be a path in a filesystem or network at which the input data can be found. The source connector identifier can specify a name or location of connector code that the workflow engine can use to interface with the specified input source.

Process specification. A declaration that identifies process types, logic, and engine to use to execute data transformations. A process type identifier can be a name or network location of a particular job, package, or other aggregation of process data that enables the workflow engine to determine what format or kind of transformation mechanism will be used. A process logic identifier can specify a source and source type. The source can be a network location of a code repository, executable code, or files containing executable code. Pathnames, repository folder tree names, or specific filenames can be specified. The workflow engine will retrieve any of these, open the relevant files, and either directly execute the code or invoke a process engine to do so. The source type can be a specification of what kind of code is found in the source. A process engine identifier can specify one or more processing engines that can execute the code.

Output specification. A declaration of the output data destination to which data is written after transformation. The output specification includes an output destination identifier and a sink connector identifier. The output destination identifier can be a path in a filesystem or network at which the output data is to be stored. The sink connector identifier can specify a name or location of connector code that the workflow engine can use to interface with the specified output destination. The output specification also can declare an event queue to which a message is to be written to announce that output has been stored.

For example, the workflow pattern can specify the output data destination as an association of specifications of: a network path to a relational database system, warehouse database, or topic in an APACHE KAFKA system; a sink connector that specifies an output interface that is programmed to interoperate with the system of the network path; and a queue identifier of an outbound message queue. With such a specification, the methods described herein can be programmed for writing a completion message to the outbound message queue specified by the queue identifier. In an embodiment, the methods can further comprise receiving, in association with the output data that has been created by a particular process engine after transforming the portion of data, one or more exception messages that specify one or more exceptions, errors, or notifications arising from the transforming, and writing, as part of the completion message, message content of the one or more exception messages.

Configuration specifications. The workflow pattern also can declare connection mechanisms, authentication types, and API keys, session secrets, or other credentials, for use in authenticating the workflow engine to the data source, data destination, and/or process engines.

A particular data processing problem could benefit from chaining multiple workflows together. For example, a workflow pattern could define first moving specified data from a POSTGRES store to an S3 store, then moving data from the S3 store to a REDSHIFT store. The workflow pattern 120 can define a workflow chain in which the output of the first workflow serves as the input to a subsequent workflow.

TABLE 2 illustrates an example workflow pattern 120 with chaining. In the example of Table 2, the syntax for declarations and specifications generally is the same as for Table 1. However, Table 2 has two complete workflow declarations. Further, the workflow engine 108 is programmed to interpret the output destination declaration and the input source declaration of "dev" to transfer the output of one workflow to the input of the other. Thus, Table 2 is an example of a workflow pattern specifying two or more workflows, each of the workflows specifying at least a particular input data source, a particular data transformation process, and a particular output data destination, in which the particular output destination of a first workflow among the two or more workflows references the particular data input of the second workflow among the two or more workflows, the first workflow and second workflow thereby being cross-referential. When the first workflow executes, the methods described herein may be programmed for storing the output data associated with the first workflow transiently, in memory or in persistent storage, for use as input to the second workflow. Typically a fast-access data storage system is used for this purpose.

While Table 2 shows two workflows for purposes of illustrating a clear example, other embodiments can use workflow patterns 120 with any number of chained workflow definitions.

TABLE 2

WORKFLOW PATTERN WITH CHAINING

```
{
  workflows :[
  {
    workflow id: 120,
    schedule: {
      type: "event",
      inbound event queue:"message1"
    }
    input: {
      input_source: "dev"
      source connector: "rds"
    },
    process: {
      process type: "sql"
      process_logic: {
        source: "project id:workflow id"
        source type: "workflow storage"
      }
      process engine: "postgres"
    },
    output : {
      output destination:
        "s3://bucket/partitionli"
      sink connector: "s3"
      outbound event queue: "message2"
    },
    metadata : {
      classification: "internal"
      access application: "inheritance"
```

TABLE 2-continued

WORKFLOW PATTERN WITH CHAINING

```
    }
  }
  workflow id: 121,
    schedule: {
      type: "event",
      inbound event queue:"message2"
    },
    input: {
      input_source: "s3://bucket/partitionli"
      source connector: "s3"
    },
    process: {
      process type: "sql"
      process_logic: {
        source: "project id:workflow id"
        source type: "workflow storage"
      },
      process engine: "redshift"
    },
    output : {
      output destination: "dev"
      sink connector: "redshift"
      outbound event queue: "message3"
    },
    metadata : {
      classification: "confidential"
      access application: "inheritance"
    }
  }
  ]
}
```

FIG. 1B illustrates details of the workflow engine of FIG. 1A and other functional elements with which the workflow engine interoperates. In an embodiment, a request 162 from a client computing device, such as user computer 130 (FIG. 1A) or from a scheduling system or job system, is associated with a workflow pattern and can be transmitted a workflow manager 164 of workflow engine 108. The workflow manager 164 is programmatically coupled to workflow pattern storage 120, a workflow processor 166, and a workflow status messaging system 170. The workflow manager 164 is programmed to queue and/or schedule, and dequeue and transmit to the workflow processor 166, request 162 and a plurality of other requests that may arrive asynchronously at workflow engine 108. The workflow manager 164 also can be programmed to implement workflow chaining, natively or by implementing an abstraction layer by which code of the workflow engine 108 or the workflow manager calls external workflow management systems such as AIRFLOW or DAGSTER.

The workflow processor 166 can be programmed to deconstruct the workflow pattern 120 and convert the workflow pattern into a plurality of blocks 168 of workflow execution, each of which can be dispatched to one or more process engines 112 and to a different service for execution. Thus, workflow processor 166 can comprise programmed logic to execute deconstruction, conversion, and distribution functions. The process engine 112 can be programmed to selectively create jobs in and/or call any of a plurality of other services, worker threads, or engines. Examples of services that can be coupled programmatically to process engine 112 include SPARKSQL service 140, SPARK service 142, AMAZON REDSHIFT service 144, APACHE KAFKA service 146, all of which are commercially available data processing systems or available as open source software libraries for integration into other systems. Elements 140, 142, 144, 146 broadly represent calls, messages, other programmatic invocations, or the specified services. As an example of the programming of process engine 112, the heuristic pseudocode of TABLE 3 can be implemented:

TABLE 3

PROCESSOR HEURISTIC PSEUDO CODE

```
if engine is spark:
    if process_logic is sparksql:
        kickoff sparksql job in managed infra (glue or cluster for
            eg)
    elif process_logic is packagedjob:
        kickoff spark job in managed infra (glue or cluster for eg)
        return notification to status messaging unit
elif engine is redshift:
    if process_logic is sql:
        kickoff job in redshift cluster
        return notification to status messaging unit
elif engine is kafka:
    if process_logic is kafka_worker:
        run message processing function
        return notification to status messaging unit
```

By programming the process engine 112 in this manner, code in a general-purpose language that is embedded in the workflow pattern 120 can be separated and transmitted to a service that is capable of executing the code. For example, the general-purpose language code can be part of a packaged SPARK job that is embedded within the workflow pattern 120.

The workflow status messaging system 170 is programmed to implement inbound and outbound event management, natively, using a KAFKA cluster, or using an external service such as SQS or LAMBDA, with an abstraction layer that enables code of the workflow engine 108 to call methods of the layer rather than directly calling SQS. The workflow status messaging system 170 can be programmed to transmit, publish to a message bus, or return in response to method calls, messages concerning the progress or status of request 162.

Figure 1C:
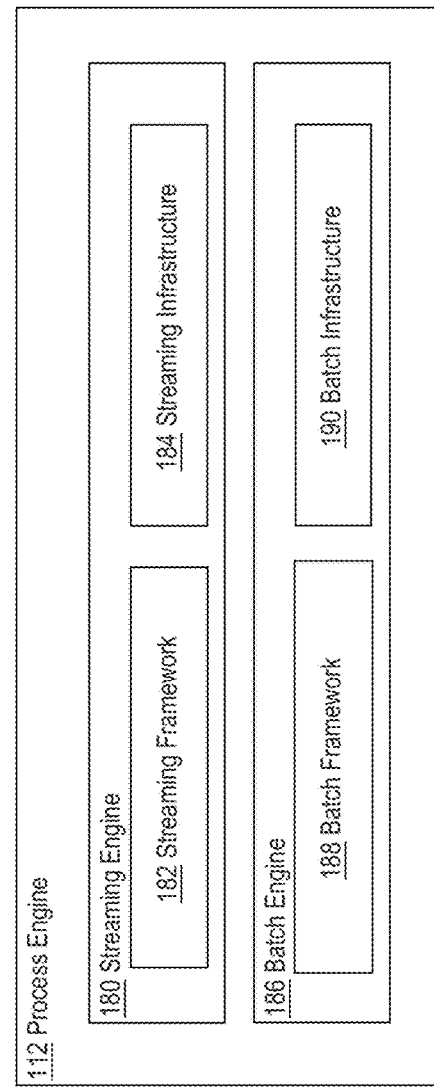
FIG. 1C illustrates details of an example process engine of FIG. 1A.

FIG. 1C illustrates details of an example process engine of FIG. 1A. In an embodiment, a process engine 112 comprises a streaming engine 180 and a batch engine 186 to support two forms of execution of a workload, streaming and batch. The streaming engine 180 comprises a streaming framework 182 and streaming infrastructure 184. The streaming framework 182 can be programmed to define and abstract specific transformation logic. The streaming infrastructure 184 can be programmed to specify which engine the workflow runs on. For example, the transformation logic could be an aggregation, SQL-based, or a filter operation, and the specific engine could be KAFKA, FUNK, or KINESIS. The streaming framework 182 can be programmed to execute message-level transformations such as filtering, SQL-based transforms, and custom transform functions.

In an embodiment, streaming engine 180 is programmed to use a publish-subscribe communication model in which application events are published through a producer that an application maintains, and topics are divided among data topics and event topics. Event topics enable consumption via event-based triggers and data topics provide for consumption of streaming data. A schema registry can be configured to centrally manage schema changes. Using streaming engine 180 as part of a platform-as-a-service of this disclosure, embodiments provide a self-serve, user powered approach concerning the following functionality.

Topic creation & Publishing data: Users can select the specific topic name they want to publish data into, with user level control to manage the producers themselves. They will also have control over schema evolution and changes, in effect having the system adapt to evolving schema.

Native message level transformation and custom transformations: Users can pick one of many options to transform the data, including filtering, basic message level transformations, basic aggregations, and custom transformations that can be extended within the framework.

Select destination to sink data: Users can sink data to multiple destinations.

No cumbersome deployments for every change. A user submission of a workflow request to the system triggers all steps necessary to execute transformations and automatically initiate status messages through a messaging system.

Native support for multiple consumers. A workflow pattern can configure multiple consumers to be subscribed to one or many topics; therefore, a particular consumer is not required to wait for data to land in a system such as S3 and undergo transformation by other batch processes to generate a published events. Instead, events can be consumed directly from the topics by external micro-services or applications.

Native support of a schema registry. With a common schema registry, users or applications can control what schema is chosen and how it evolves, as they have control over their own producers. The system can be programmed to automatically handle schema evolution over time, within the topics themselves.

Native support of real time or near real-time execution. A streaming workflow pattern can result in low latency data landing and consumption system at scale. For the consumption side, an application could be directly subscribed to a topic instead of waiting for a batch process to aggregate and process the data.

The batch engine 186 comprises a batch framework 188 and batch infrastructure 190. The batch framework 188 is programmed to define and abstract specific transformation logic. The batch infrastructure specifies which engine the workflow runs on. For example, the transformation logic could be an aggregation, join, or filter operation, and the specific engine could be SPARK on EMR, SPARK on DATABRICKS, SPARK on GLUE, OPENSHIFT, or SPARK streaming.

In some embodiments, system 100 of FIG. 1A also may include a testing engine 150 that is programmed to validate the results of the workflow pattern 120. The testing engine 150 can be programmed to receive invocation signals from the user computer 130 and to generate sampled data outputs that would result from executing a workflow pattern 120, with or without a chained workflow. In an embodiment, testing engine 150 is integrated with a JUPYTER notebook that shows sampled data. The testing engine 150 can be beneficial for testing SPARK jobs, whether packaged or using SPARKSQL, using DATABRICKS or EMR notebooks. Testing related to SQL can be triggered natively via REDSHIFT or AMAZON RDS, and results can be sampled and returned to the user computer 130.

Figure 2:
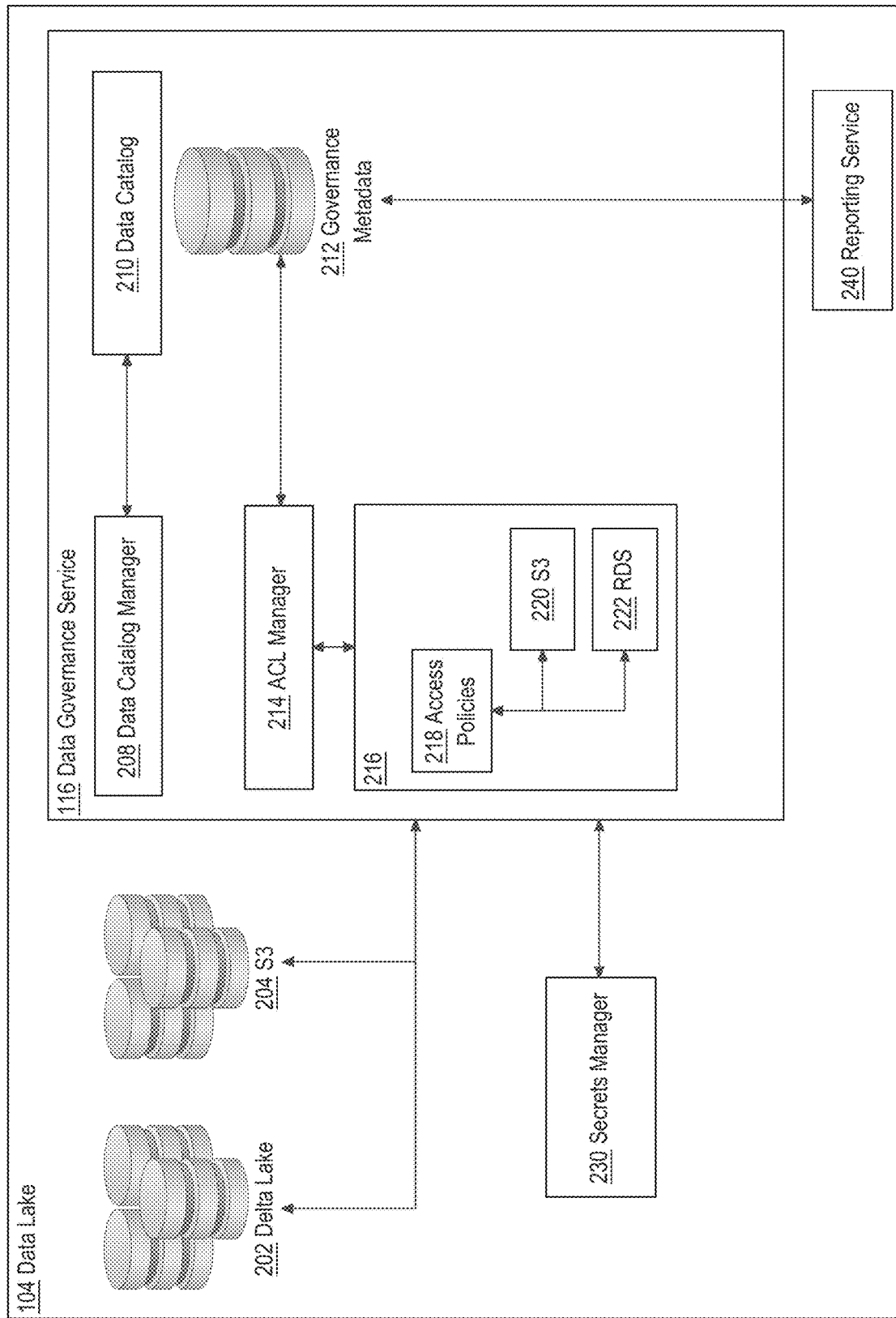
FIG. 2 illustrates details of an example data lake, in one embodiment.

FIG. 2 illustrates details of an example data lake, in one embodiment. One or more primary data storage systems 202, 204 are communicatively coupled to a data governance service 116. The data governance service 116 comprises a data catalog manager 208, which is programmatically coupled to a data catalog 210. Governance metadata 212, which can be RDS-based, is coupled to an access control list (ACL) manager 214, which can access an access registry 216 having a plurality of access policies 218 for different users, groups, or entities. A particular access policy 218 can comprise a hierarchical definition of access controls for different systems; for example, there can be a first policy 220 governing access to data in an S3 repository, a second policy 222 for access to an RDS repository, and so forth. The governance metadata 212 can be programmatically coupled to a reporting service 240. A secrets manager 230 can communicate programmatically with data governance service 116 to periodically provide updates concerning secret data tables, rows, or columns, or respond to queries about whether a particular ACL entry is valid or allowed to access a particular table, row, or column.

In the data storage architecture of FIG. 2, the primary data storage systems 202, 204 can be object storage or block storage. In an embodiment, the primary storage systems 202, 204 support scalability, high throughput, extensive metadata management capabilities and economy of scale. Examples of primary data storage systems 202, 204 for the data lake 104 is AMAZON S3 or AMAZON SIMPLE STORAGE SERVICE, in conjunction with DELTA LAKE from DATA-BRICKS. Additionally, a block storage mechanism can be provided to support low latency, scalability, database support for fast reads and writes. The block storage mechanism can be a relational database system, AMAZON REDSHIFT data warehouse, or functionally similar service can be used. The block storage mechanism can be configured primarily to store a processed or dimensionalized version of the raw data.

The architecture of FIG. 2 is intended to decouple storage from computing elements. Some or all data stored in the primary data storage systems 202, 204 can implement compression. Compression types can include BZIP2, GZIP, PARQUET, ORC, AVRO, SNAPPY, LZO, or TOAST compression on RDS or Postgres instances. Some or all data stored in the primary data storage systems 202, 204 can implement encryption. Some or all data stored in the primary data storage systems 202, 204 can implement horizontal or vertical partitioning.

The secrets manager can enforce data classifications such as Public, Internal only, Confidential, Restricted, Sensitive, and data subcategories such as PCI data, GDPR controls, financial data controls, or healthcare data controls.

The access control and governance elements can be programmed to implement API-based access control that allows scalability of policy enforcement and reduces manual work, providing the ability for programs to query and obtain responses concerning current data visibility, such as: Who has access to a given dataset? What is their given view to the dataset? What data can the user access? How can a user get access to the dataset?

Figure 3A:
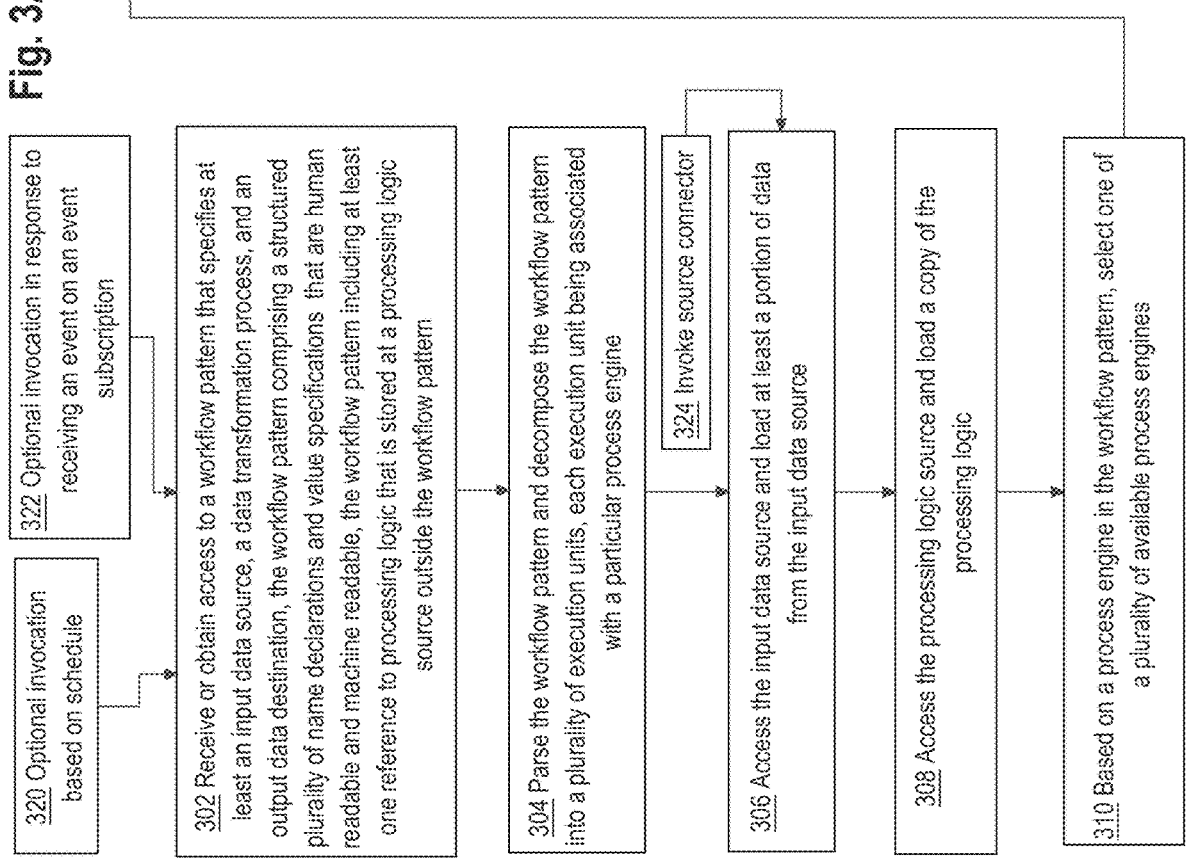
FIG. 3A illustrates an example computer-implemented process or algorithm of executing data transformations using a platform as a service.

2.2 Example Programmed Process Flow or Algorithm for Executing Data Transformations Using Platform as a Service FIG. 3A illustrates an example computer-implemented process or algorithm of executing data transformations using a platform as a service. FIG. 3A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, the process of FIG. 3A initiates execution at block 302 at which the process receives or obtains access to a workflow pattern that specifies at least an input data source, a data transformation process, and an output data destination, the workflow pattern comprising a structured plurality of name declarations and value specifications that are human readable and machine readable, the workflow pattern including at least one reference to processing logic that is stored at a processing logic source outside the workflow pattern. In an embodiment, the workflow pattern received or obtained at block 302 can have any of the elements that have been described in the previous section for workflow pattern 120.

As shown at block 320, optionally the process can be invoked based on a schedule, in the form of a CRON job or other scheduled execution. Or, at block 322, optionally the process can be invoked in response to receiving an event associated with an event subscription of a message bus, native or custom publish-subscribe facility, or other programmatic message mechanism.

At block 304, the process is programmed to parse the workflow pattern and decompose the workflow pattern into a plurality of execution units, each execution unit being associated with a particular process engine. For example, workflow processor 166 (FIG. 1B) divides the workflow into execution units 168 and dispatches a plurality of different service requests, via process engine 112, to services 140, 142, 144, 146.

At block 306, the process is programmed to access the input data source specified in the workflow pattern, and to load at least a portion of data from the input data source. In some embodiments, the data is loaded into main memory; partitioning, sharding, streaming, or other loading techniques can be used depending on the size or constraints of main memory. In some embodiments, as seen at block 324, block 306 can involve invoking a source connector to obtain a database connection or functionally equivalent access to the specified input data source.

At block 308, the process is programmed to access the processing logic source and load a copy of the processing logic. For example, in the case of the workflow of TABLE 1, block 308 would cause the process to access a specified code repository of the GITHUB program code repository service and load files denoted "nightly-etl.git" and access the S3 service to load a code file denoted "nightly-etl.zip". At block 310, the process is programmed to select, based on a process engine in the workflow pattern, one of a plurality of available process engines. In the example of TABLE 1, available process engines are specified as "spark, kafka, redshift, pod."

At block 312, the process is programmed to invoke, call, or transmit to the particular process engine, the portion of data and the copy of the processing logic. Block 312 can be programmed as a plurality of calls to the specified external services with the specified code files as payloads. In response, as shown by block 314, each process engine executes the specified processing logic using the portion of the data in memory. Or, block 314 can be programmed to call an external service to execute the processing logic using the portion of data, to result in creating and storing output data.

At block 316, the process is programmed to access the output data destination and store the output data at the output data destination. In some embodiments, as in the case of TABLE 1, and as specified by block 326, the process is programmed to invoke a sink connector to enable access to the output data definition. Or, at block 318, the process is programmed to store, when the workflow pattern specifies chaining, the output data for use by the next workflow; data can be transiently stored in main memory or written to a rapid-access data storage system to enable fast loading for use by the next elements of the workflow.

At block 328, the process is programmed to write a message to an outbound event queue. Block 328 can be used to report completion of the data transformations, or to report any exceptions, errors, or notifications that have been received from the external services.

In this manner, applications can invoke any of multiple different data transformations by specifying source data, transformations, and sink data symbolically as part of a workflow pattern. Users can prepare the workflow pattern in a text editor using an accessible, efficient human-readable symbolic language that also is machine readable and capable of parsing. Rather than learning the details of multiple different services that execute different transformations in different formats, and rather than learning interface requirements or call requirements to invoke processing services, users or applications can use a canonical format to express source data, sink data, and transformations, including but not limited to custom logic that can be passed to an external service for execution. Data transformations can be centrally managed, improving clarity and reducing errors. Data engineering work associated with creating custom pipelines or workflows is dramatically reduced because users can prepare declarations or specifications of a workflow, or pipeline of multiple workflows, in an understandable workflow pattern. Yet the workflow pattern also is machine readable and capable of interpretation or translation into specific workflow units that a process engine can use to call transformation services. Data governance requirements, including access restrictions and security controls, can be enforced automatically without user programming or declaration. Consequently, embodiments can greatly reduce the number of systems with which applications or users interact and can reduce the number and extent of network messages required to accomplish data transformations.

Figure 3B:
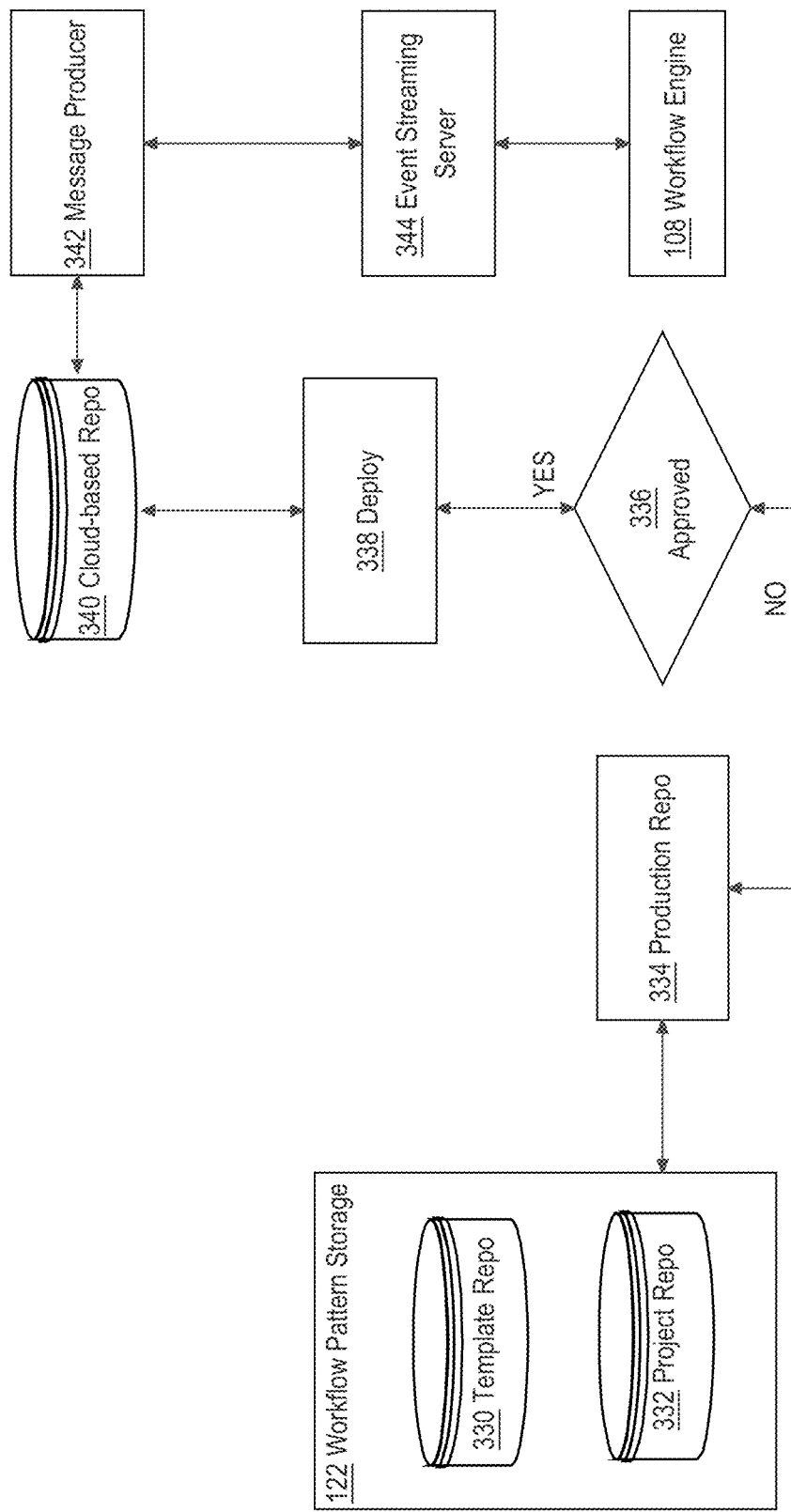
FIG. 3B illustrates an example data flow for automatic processing of a workflow definition in a domain-specific language after an initial manual submission step.

In an embodiment, the processes previously described herein can be supplemented with self-service, automatically driven triggers and controls to fully integrate an embodiment into a larger continuous integration/continuous development process. FIG. 3B illustrates an example data flow for automatic processing of a workflow definition in a domain-specific language after an initial manual submission step. In one approach, workflow pattern storage 122 (FIG. 1) is divided into a template repository 330 and a project repository 332; the template DSL can store workflow patterns as domain-specific language (DSL) templates and the project repo can comprise instantiations of templates with particular parameter values filled in or completed. A set of DSL that has been created from the template repository 330 and moved to the project repository 332 is transferred to a production repository 334 at which validation tests are executed on the DSL. Transferring the DSL can comprise a manual or automatically scheduled copy operation, and validation tests can be manually initiated or scheduled. At block 336, a test is executed to determine whether the DSL is approved by passing the validation tests. If one or more validation tests fail, then approval fails, and control returns to the production repository 334 in which the DSL can be modified and tested again.

Upon validation, at block 338, an automatic deployment operation can submit the DSL to a specific bucket in a cloud-based repository 340. In some embodiments, block 338 can be implemented using a server process that has been programmed using the JENKINS open source automation server, the code for which is available at the time of this writing at the GITHUB service in the folder/jenkinssci/jenkins. In some embodiments, cloud-based repository 340 is configured using AMAZON S3 and the target of the JENKINS server can be a specific S3 bucket. The S3 bucket can be programmed, using a message producer 342 such as the AWS LAMBDA server and the KINESIS producer library, to automatically trigger transmission of a message directed to an event streaming server 344. In some embodiments, event streaming server is implemented using APACHE KAFKA. The workflow engine 108 can be programmed to subscribe to a specific event topic, which is the target of the message from the message producer 342. When a message is published to the event topic, the workflow engine 108 is programmed to automatically translate the DSL to corresponding input, process and output sub-workflows and execute them in the manner previously described.

2.4 Example Programmed Process Flow or Algorithm for Data Quality as a Service

Figure 4:
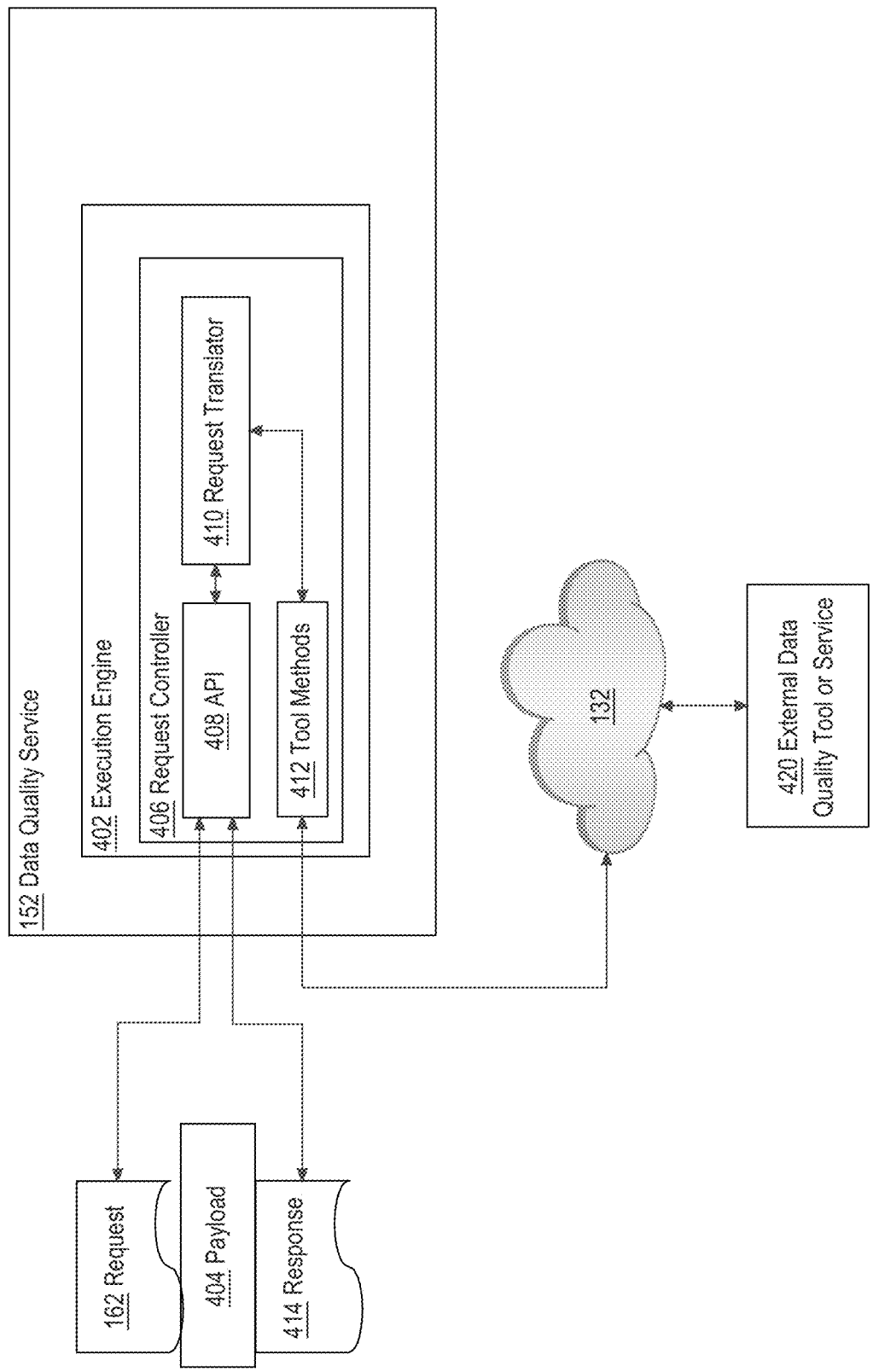
FIG. 4 illustrates an example architecture for a data quality service.

FIG. 4 illustrates an example architecture for a data quality service. In an embodiment, the system 100 of FIG. 1A can comprise a data quality service 152 that is programmed to implement data quality controls directed to accuracy, completeness, timeliness, and consistency. Examples of programmable techniques include executing data quality checks when an input data source is first accessed and read, and before output data is written to a destination, anomaly detection that relies on statistical techniques such as Kalman filters to detect anomalous events, and a self-healing system based on rule-based recovery with retry logic to recover from failures. Each of these techniques can be exposed to users or applications via constructs in the workflow pattern 120, application programming interfaces, or other programmatic connections.

In this context, accuracy refers to whether the stored data values reflect what was intended and whether data and formats of output data have inconsistencies, gaps or missing data compared to the input data. Completeness refers to whether a subset of records in a data source are missing dimensional data. Timeliness refers to whether execution of the system meets Service Level Agreements (SLA) for reporting or for communications with consumer processes. Consistency refers to whether data across disparate systems reflects the same information and is synchronized across an enterprise.

Data quality service 152 can be programmed as an extensible tool providing a service layer with a central execution engine 302 that can be called from workflow engine 108 or other applications to which user computer 130 has access. The execution engine 302 can be programmed to execute data quality checks based upon parameters specified in a request. Using a parameterized approach, users or applications can specify one or more requested checks symbolically using a specification language that is based on SQL or symbolic rules.

As an example, a request 162 from an application can have a payload 404 that specifies a data quality assertion in any of several formats. TABLE 4, TABLE 5, and TABLE 6 present examples of data quality assertion.

TABLE 5

Unmet expectation with Associated Actions -> PagerDuty (PD) alert and Healing heuristic:

In an embodiment, a binary comparison between source and target is not necessarily required, users can define as many sources as they like (for each request payload to dq service) and reference each source with a tag such as "source_name" in the expectation variable. Specifying

TABLE 5-continued

Unmet expectation with Associated Actions -> PagerDuty (PD) alert and Healing heuristic:

variable_name(source_name1, source_name2...) denotes an expectation for all sources defined within ( ) that share the same variable, to avoid repetition. Users can also specify source_name.variable independently.

```
{
    expectation: {
        application_count(s3_project_name1, redshift_project_name1): 10000,
        s3_project_name1.date: "2021-03-31",
        postgres_project_name2.count: 10001,
        actions: {
            failure: {
                send_pd_alert: "true",
                alert_priority: "high"
            }
            healing_heuristic: {
                if application_count(s3_project_name1, redshift_project_name1) <> 10000 or
                    date <> '2021-03-31' then run
                        'https://github.com/upstart/project-dsl-
                        submission/workflow_dsl/sample_project1/backfill_workflow.json'
                else if application_count(s3_project_name1, redshift_project_name1) < 10000
                    and date == '2021-03-31' then run
                        'https://github.com/upstart/project-dsl-
                        submission/workflow_dsl/sample_project1/missing_records_reload_workfl
                        ow.json'
            }
        }
    },
    sources: [
        {
            source_name: s3_project_name1,
            query: "select count(*) as application_count, avg(I.income) as
                average_income from applications A
                join applicant_info I on A.applicant_id = I.applicant_id
                where date='2021-03-31' group by date",
            source_type: "s3",
            source path: "s3://bucket_name/project/partition/"
        },
        {
            source_name: redshift_project_name1,
            query: "select application_count, average_income from
                applications_aggregated where date='2021-03-31'",
            source_type: "redshift",
            source_schema: "etl_schema"
        },
        {
            source_name: postgres_project_name2,
            query: "select count(*) as application_count, avg(I.income) as
                average_income from applications A
                join applicant_info I on A.applicant_id = I.applicant_id
                where date='2021-03-31' group by date",
            source_type: "postgres",
            source_schema: "upstart"
        }
    ]
}
```

TABLE 6

Expectation is met with Associated actions -> Logging and No healing, No PD:

```
{
    expectation: {
        application_count(s3_project_name1, redshift_project_name1):
            10000,
        s3_project_name1.date: "2021-03-31",
        postgres_project_name2.count: 10001,
        actions: {
            pass: {
                logging: "true",
                log_destination: "datadog"
            }
        }
    },
    sources: [
        {
            source_name: s3_project_name1,
            query: "select count(*) as application_count,
                avg(I.income) as
                average_income from applications A
                join applicant_info I on A.applicant_id =
                I.applicant_id
                where date='2021-03-31' group by date",
            source_type: "s3"
            source path: "s3://bucket_name/project/partition/"
        },
        {
            source_name: redshift_project_name1,
            query: "select application_count, average_income from
                applications_aggregated where date='2021-03-31'",
            source_type: "redshift",
```

TABLE 6-continued

Expectation is met with Associated actions ->
Logging and No healing, No PD:

```
            source_schema: "etl_schema"
    },
    {
        source_name: postgres_project_name2,
        query: "select count(*) as application_count,
        avg(I.incom) as
            average_income from applications A
            join applicant_info I on A.applicant_id =
            I.applicant_id
            where date='2021-03-31' group by date",
        source_type: "postgres",
        source_schema: "upstart"
    }
    ]
}
```

TABLE 7

Expectation is unmet with Associated actions - Logging, No healing and No PD:

```
{
    expectation: {
        application_count(s3_project_name1, redshift_project_name1): 10000,
        s3_project_name1.date: "2021-03-31",
        postgres_project_name2.count: 10001,
        actions: {
            failure: {
                logging: "true",
                log_destination: "datadog"
            },
            healing_heuristic: {
                if application_count(s3_project_name1, redshift_project_name1) <> 10000 or
                        date <> '2021-03-31' then run
                            'https://github.com/upstart/project-dsl-
                            submission/workflow_dsl/sample_project1/backfill_workflow.json'
                    else if application_count(s3_project_name1, redshift_project_name1) < 10000
                            and date == '2021-03-31' then run
                            'https://github.com/upstart/project-dsl-
                            submission/workflow_dsl/sample_project1/missing_records_reload_workfl
                            ow.json'
            }
        }
    },
    sources: [
        {
                source_name: s3_project_name1,
                query: "select count(*) as application_count, avg(I.income) as
                        average_income from applications A
                        join applicant_info I on A.applicant_id = I.applicant_id
                        where date='2021-03-31' group by date",
                source_type: "s3",
                source path: "s3://bucket_name/project/partition/"
        },
        {
                source_name: redshift_project_name1,
                query: "select application_count, average_income from
                        applications_aggregated where date='2021-03-31'",
                source_type: "redshift",
                source_schema: "etl_schema"
        },
        {
                source_name: postgres_project_name2,
                query: "select count(*) as application_count, avg(I.income) as
                        average_income from applications A
                        join applicant_info I on A.applicant_id = I.applicant_id
                        where date='2021-03-31' group by date",
                source_type: "postgres",
                source_schema: "upstart"
        }
    ]
}
```

Execution engine 402 can be programmed as one tool set of instructions, or a combination of tools. For example, with REDSHIFT or POSTGRES, the execution engine 402 can be programmed to translate the payloads set forth above into one or more expectations for the GREAT EXPECTATIONS data quality assertion system, invoke and execute a GREAT EXPECTATIONS workflow, and return results in a specified format such as JSON that other applications or services can consume and use. In some embodiments, quality checks for data records stored in S3 databases can invoke the AMAZON AWS ATHENA interactive query tool, with automated crawling of data to create data catalogs; an example data crawler is AMAZON AWS GLUE.

In an embodiment, execution engine 402 comprises a request controller 406, which is programmed to execute request intake and responses. In one embodiment, the request controller comprises an application programming interface 408, request translator 410, and one or more tool methods 412. The API 408 can interoperate with the GraphQL query language to receive, parse, and dispatch function calls based on the request 162 and payload 404. In an embodiment, a request 162 has a payload 404 of the form shown in TABLE 5, TABLE 6. An application or process transmits a request by calling a function call of API 408 that includes the request 162 and payload 404. In some embodiments, the calling application or process can be workflow processor 166, and the payload 404 can form a part of a workflow pattern 120.

In response, API 408 programmatically calls the request translator 410 and provides the request 162 and payload 404. The request translator 410 can be programmed to translate the request 162 and payload 404 into the instructions that are appropriate for using one or more different external data quality tools or services 420 that are accessed via tool methods 412. For purposes of illustrating a clear example, single blocks are shown in FIG. 4 to represent tool methods 412 and external data quality tools or services 420, but in practical embodiments, any number of these elements can be provided. In an embodiment, request translator 410 can be programmed to parse an input configuration file in the payload 404 and select which tool to invoke via tool methods 412 to execute data quality checks and return results from the tool methods in a standard format via a response 414.

The tool methods 412 can be programmed to call or invoke external tooling frameworks such as GREAT EXPECTATIONS and/or can be implemented as wrappers that provide native support to run expectations, received in the payload 404, against mapped data sources. The translated instructions or queries can execute against data sources such as POSTGRES, AMAZON REDSHIFT, and AMAZON S3. When the external data quality tool or service 420 responds, the tool methods 412 receive the response and reformat the response from any native format that was used at the external data quality tool or service, forming response 414 in a canonical format. The tool methods 412 return a result to request translator 410, which in turn dispatches the response 414 to the application or process that called API 408.

The payload 404 of a response 414 can be used externally by internal or external applications to generate alerts or invoke the reporting service 240 (FIG. 2) to generate alerts or notifications. The payload 404 can be written to a log file, to governance metadata 212, and/or reported to an external logging service such as DATADOG or PAGERDUTY, which can enable automatic initiation of escalation paths or other actions or applications based on the content of log messages.

In some embodiments, data quality service 152 can be programmed to implement self-learning techniques to derive one or more expectations in real-time by analyzing results of historical runs. In an embodiment, the results of historical data quality checks are persistently stored in a data repository such as in primary data storage system 204. The data quality service 152 is programmed to query the results of the historical data quality checks to dynamically generate expectations about data associated with a then-current run. Results from one or more queries can be subjected to anomaly detection, to understand how data is evolving over time, to set benchmarks, to set checkpoints, or other purposes. As an example, the average value of a column can be persistently stored on an ongoing basis to provide a historic view of the change in the average value; the data quality service 152 can be programmed to query and retrieve the average values of the past N number of runs and determine whether a then-current run has an average value for the same column attribute that is within M standard deviations from the historic average and, in response to determining that the average value for the then-current run exceeds the expected range, generate a notification, alert, or log file record.

In this manner, applications can invoke any of multiple different external data quality tools or services by specifying requests symbolically in a request, payload, configuration file, or as part of a workflow pattern. Users can prepare the request or workflow pattern in a text editor using an accessible, efficient human-readable symbolic language that also is machine readable and capable of parsing. Rather than learning the details of multiple different external data quality tools or services, users or applications can use a canonical format to express expectations for data tables, rows, or columns, invoke external services, and receive results concerning the quality of the data in the target data sources. Data quality checks can be integrated automatically into larger workflows. Consequently, embodiments can greatly reduce the number of systems with which applications or users interact, can reduce the number and extent of network messages required to accomplish data quality checks, and can program data quality checks to occur automatically as part of a larger workflow in response to the creation of output data or writing to a destination data source.

While certain embodiments have focused on data integrity checks, other embodiments can be programmed to test machine learning model quality through pre-training and post-training tests. For example, pre-training tests can specify expectations in terms of model prediction shape or the same number of rows as the input features. Post-training tests can express expectations in the form of an invariance test or directional expectation test. In an example invariance test, the number of letters in the name of the university that applicant graduated from should not determine their eligibility to be approved for a loan. If it does, a failed test occurs. In an example directional expectation test, the higher the applicant's income, the higher the probability of them getting approved for a loan. Tests of this kind can be programmed as pluggable modules within the execution engine of the data quality service.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
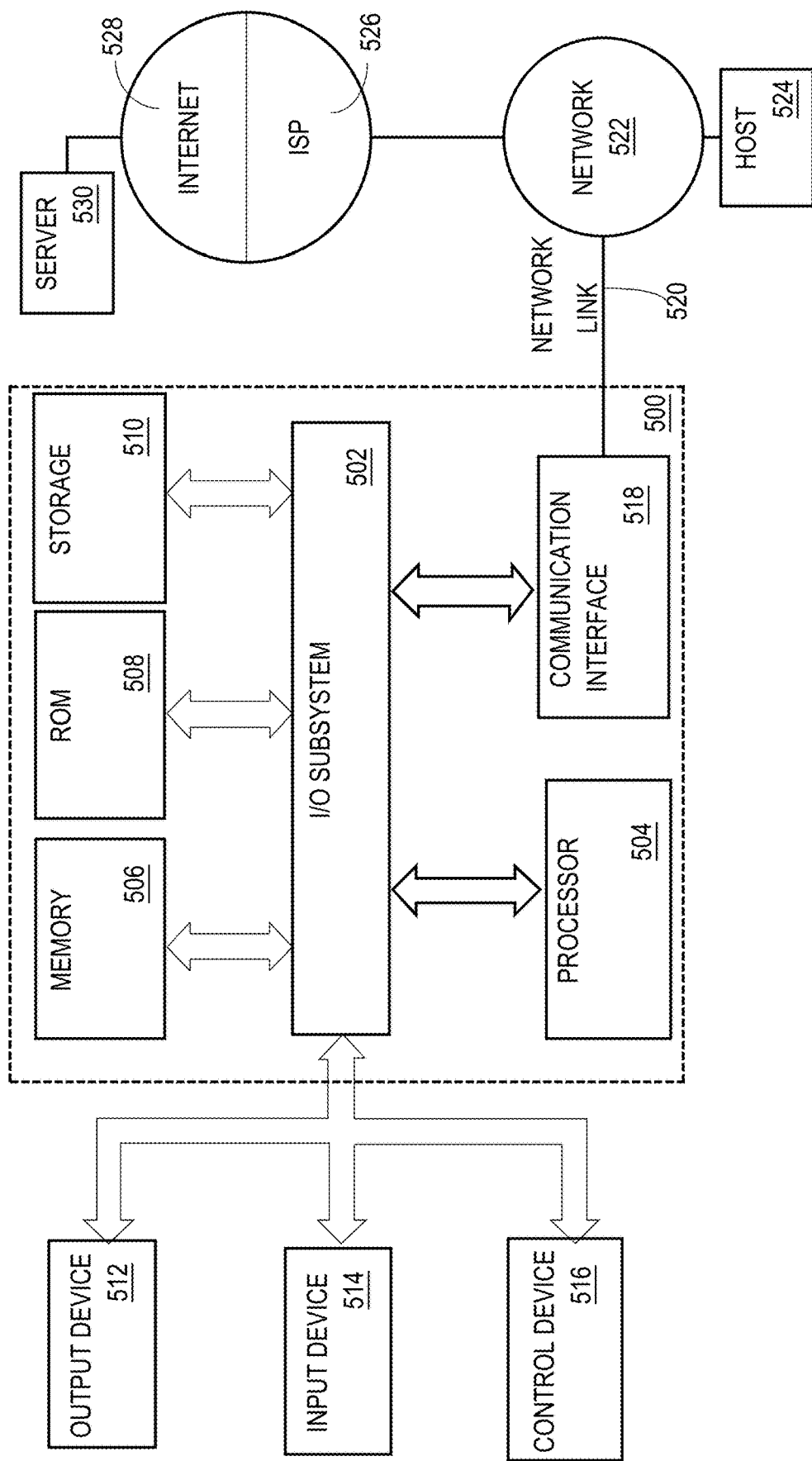
FIG. 5 illustrates a computer system with which one embodiment could be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Appendix—Example Domain-Specific Language for Workflow Patterns

This Appendix specifies an example domain-specific language (DSL) that can be used to specify workflow patterns. The Appendix is organized in sections that specify DSL concepts and naming conventions, Streaming workflow with chaining, Batch Data Pipeline Workflow, Scheduled workflow, Scheduled and chained workflow with parallel execution, Event based workflow trigger, Template based workflow generation, CI/CD for DSL submission to workflow engine, and other examples that can be used in various embodiments.

DSL concepts and naming conventions. In an embodiment, the following terms have the following meanings.

workflow_tag: A unique identifier that references each atomic workflow.

workflow_description: Describe your workflow & what it does, so users have a clearer understanding.

workflow_parent_tag: To indicate the parent tag that will be executed prior to this tag. This is optional if the current workflow is sequentially ordered subsequent to the previous workflow, i.e the dependency chain is inferred.

schedule: This forms the definition for a cron style schedule or an event based trigger, delineated by a type definition. A cron type will require a scheduled orchestration & will leverage an existing workflow orchestration mechanism such as airflow (specific to batch use cases). An event type on the other hand will rely on an inbound_event_group definition that has a static list of events (event_list) or regex based events (event_regex). The listeners to these events are part of the workflow engine & the events themselves are published to separate event topics in kafka.

input: This forms the definition for the input layer of the workflow.

source_connector: This is part of the input definition & indicates the connector type where data is sourced from. This could be s3, postgres or even a kafka_topic, the list will expand as we add more connectors to the platform.

schema: This section provides users the ability to add a specification about the format of the schema, schema file location (source) & type of source.

topic_name: This provides users the ability to define a custom topic name where events are published through streaming architecture. This option will only apply when process_type falls under the streaming bucket.

process: This section provides users the ability to define the type of process engine (streaming, batch) that they would like to run an optional transform logic on.

process_type: This refers to the connector type, where data is sourced from. This could be s3, postgres or even a kafka_topic. process_logic: This section provides users the ability to define the transformation logic source code, location of source code & type of source repository (git, gitlab etc)

output: This forms the definition for the output layer of the workflow sink_connector: This allows users the ability to define type of sink connector (eg s3, postgres, kafka topic—an expandable list) for landing data, the connector will be a pre-built connector the workflow engine can reference to sink data per the transformations defined in the process section.

sink_type: This allows users the ability to pick a sink type, when referencing a data lake raw, staged or transformed layer. This option may not be available if your sink_connector is a kafka topic or postgres. In order to future proof usage of this notation for specific processing in each data lake layer, we have this as an option.

output_destination: This allows users to specify a more precise destination landing zone. This could be an s3 partition (within preset buckets), relational db or table—an expandable list.

output_format: This allows users to define the specific output type, for example parquet, avro, csv—an expandable list.

Streaming Workflow with Chaining:

```
{
   workflows: [{
   workflow_tag: "tableA_to_in_topicA_ingestion",
   workflow_description: "Ingestion from tableA into kafka topicA",
      input: [
   source_connector: "kafka_topic",
   schema: {
      format: "avro",
      source:       "git@github.com:teamupstart/paas.git/projectid
      /in_topicA.avsc",
      source_type: "git"
   },
   topic_name: "in_topicA",
      ],
      process: [
      process_type: "kafka_worker",
      process_logic: {
         source:      "git@github.com: teamupstart/paas.git/projectid
         /transform_script.py",
         source_type: "git"
      },
   process_engine: "kafka"
   ],
   output : [
      sink_connector: "kafka_topic",
      topic_name: "out_topicB"
   ]
   },
   {
      workflow_tag:"in_topicA_to_dlk_raw_transformation",
   workflow_parent_tag: "tableA_to_in_topicA_ingestion",
   input: [
   source_connector: "kafka_topic",
   schema: {
      format: "avro",
   source: "git@github.com:teamupstart/paas.git/projectid
   /in_topicA.avsc",
      source_type: "git"
   }
   topic: "out_topicB"
   ],
   process: [
      process_type: "spark_streaming",
      process_logic: {
         source:      "git@github.com:teamupstart/paas.git/projectid
         /spark_streaming_transform_script.py",
         source_type: "git"
      },
   process_engine: "spark"
   ],
   output : [
      sink_connector: "s3"
      sink_type: "s3_datalake_raw"
      output_destination: "s3://de-dp-datalake raw/partition_out1/",
      output_format: "parquet" (optional)
   ]
   }]
}
```

[1] Batch Data Pipeline Workflow:

```
{
   "workflows": [
   {
```

```
      "workflow_tag": "Running Pyspark process",
      "input": [
      {
         "source_connector": "jdbc",
         "input_sql": "(SELECT * FROM public.
         upstart_application_history_records) as U",
         "output_view_name": "df_uahr",
         "input_format": "jdbc",
         "url": "",
         "user": "",
         "password": "",
         "driver": "org.postgresql.Driver",
         "partition_column": "id"
         "num partitions": "10",
         "lower_bound": "0"
         "upper_bound": "130000000"
      }
      ],
      "process": [
      {
         "process_name": "historical_feature_store",
         "process_type": "spark_dataframe"
         "process_engine": "spark",
         "script_name": "extract_job.py",
         "input_view": [
            "df_uahr"
         ],
         "output_view": [
            "processed_df",
            "domain_events_df"
         ]
      }
      ],
      "output": [
      {
         "sink_connector": "s3",
         "input_view_name": "processed_df",
         "output_path": "",
         "output_format": "parquet"
      },
      {
         "sink_connector": "s3",
         "input_view_name": "domain_events_df",
         "output_path": "",
         "output_format": "parquet"
      }
      ]
   }
   ]
}
```

[2] Scheduled Workflow:

```
{
workflow: {
   schedule: {
      type: "cron",
      cron: "5 4 * * *"
   }
   workflow_tag: "dlk_raw_to_staged_transformation_tableA",
   input: [
      source_connector: "s3",
      input_source: "s3://de-dp-datalake-raw /partition_out1/",
      schema: { (optional)
         format: "parquet",
            source: "git@github.com:teamupstart
            /paas.git/projectid/in_topicA.csv",
         source_type: "git"
      },
      input_format: "parquet"
   ],
   process: [
      process_type: "spark_sql",
      process_logic: {
         source: "git@github.com:teamupstart
         /paas.git/projectid/spark_transform_script.sql",
         source_type: "git"
```

```
        },
        process_engine: "spark"
    ],
    output : [
        sink_connector: "s3",
        sink_type: "s3_datalake_staged",
        output_destination: "s3://de-dp-datalike-staged
        /partition_out1/",
            output_format: "parquet" (optional)   ]
    }
}
```

[3] Scheduled and chained workflow with parallel execution:

```
{
workflows: [{
    schedule: {
        type: "cron",
        cron: "5 4 * * * *"
    }
    workflow_tag: "dlk_raw_to_staged_transformation_tableB",
    input: [
        source_connector: "s3",
        input_source: "s3://de-dp-datalakake-raw /partition_out2/",
        schema: { (optional)
            format: "parquet",
            source: "git@github.com:teamupstart
            /paas.git/projectid/in_topicB.csv",
            source_type: "git"
        },
        input_format: "parquet",
    ],
    process: [
        process_type: "spark_sql",
        process_logic: {
                source: "git@github.com:teamupstart
                /paas.git/projectid/spark_transform_script_tableB.s
                ql",
                source_type: "git"
        },
        process_engine: "spark"
    ],
    output : [
        sink_connector: "s3",
        sink_type: "s3_datalake_staged", output_destination:
        "s3://de-dp-datalakake-staged /partition_out2/",
        output_format: "parquet" (optional) ]
    },
    {
        workflow_tag:"dlk_staged_to_transformed_layer_tableB_parallel_
        execution1",
        parent_workflow_tag:
        "dlk_ raw_to_staged_transformation_tableB", (optional if
        current workflow is sequentially ordered subsequent to the
        previous workflow, dependency chain is inferred)
        input: [
            source_connector: "s3",
            input_source: "s3://de-dp-datalakake-staged
            /partition_out2/",
            schema: { (optional)
                format: "parquet",
                source: "git@github.com:teamupstart
                /paas.git/projectid/in_topicA.csv",
                source_type: "git"
            },
            input_format: "parquet"
        ],
        process: [
            process_type; "spark_sql",
            process_logic: {
                source: "git@github.com:teamupstart
                /paas.git/projectid/spark_transform_script_tableB.sql",
                source_type: "git"
            },
            process_engine: "spark"
        ],
    output : [
        sink_connector: "s3"
            sink_type: "s3_datalake_staged",
            output_destination: "s3://de-dp-datalake
            transformed/partition_out3/",
        output_format: "parquet"
        event: {
            event_tag: "staged_transform_partition_out3"
            }
        ]
    },
    {
    workflow_tag:
    "dlk_staged_to_transformed_layer_tableB_parallel_execution2",
    parent_workflow_tag: "dlk_raw_to_staged_transformation_tableB",
    (this is not optional, if instantiated from parent workflow & not
    sequentially ordered after parent workflow, dependency chain is
    "not" inferred)
    input: [
        source_connector: "s3",
        input_source: "s3://de-dp-datalakake-staged /partition_out2/",
        schema: { (optional)
            format: "parquet",
            source: "git@github.com:teamupstart
            /paas.git/projectid/in_topicA.csv",
            source_type: "git"
        },
        input_format: "parquet"
    ],
    process : [
        process_type: "spark_sql",
        process_logic: {
            source: "git@github.com:teamupstart
/paas.git/projectid/spark_transform_script_tableB_updated.sql",
            source_type: "git"
        },
        process_engine: "spark"
    ],
    output : [
        sink_connector: "s3",
        sink_type: "s3_datalake_staged"
        output_destination: "s3://de-dp-datalake
        transformed/partition_out4/",
        output_format: "parquet"
        event: {
            event_tag: "staged_transform_partition_out4"
            }
        ]
    }]
}
```

[4] Event-Based Workflow Trigger:

```
{
workflow: {
    schedule: {
    type: "event",
    inbound_event_group: {
        event_list: ["staged_transform_partition_out3"]   }
        },
        workflow_tag: "dlk_staged_to_transform_layer_tableA",
        input: [
    source_connector: "s3",
        input_source: "s3://de-dp-datalakake-staged /partition_out1/",
        schema: { (optional)
            format: "parquet",
            source: "git@github.com:teamupstart
            /paas.git/projectid/in_topicA.csv",
            source_type: "git"
        },
        input_format: "parquet"
    ],
    process: [
        process_type: "spark_sql"
        process_logic: {
            source: "git@github.com:teamupstart
            /paas.git/projectid/spark_transform_script_from_staged.sql",
```

```
            source_type: "git"
        },
        process_engine: "spark"
    ],
    output: [
        sink_connector: "s3",
        sink_type: "s3_datalake_staged",
        output_destination: "s3://de-dp-datalake
        transformed/partition_out5/",
        output_format: "parquet"
    ]
    }
}
```

Template Based Workflow Generation:

Template based workflow generation can be useful when a user needs to auto generate workflow DSLs, when it involves pulling data from data sources such as tables. For example, using a debezium connector to highlight the list of tables to extract data from and applying subsequent transform logic. Embodiments can be programmed to map all input tables to multiple workflow DSLs that are auto-generated with the following pattern. An example template is:

```
{
    "connector.class": "io.debezium.connector.postgresql.
PostgresConnector",
    "plugin.name": "wal2json_rds_streaming",
    "slot.name": "debezium_monolith_20210331",
    "database.hostname": "prod-db.dbprod.internal",
    "database.port": "5432",
    "database.user": "debezium",
    "database.password": "${password}",
    "database.dbname": "prod_monolith",
    "database.server.name": "debezium.monolith.v20210331",
    "input_tables": {
    "table.whitelist":  "public.vehicle_claims,public.kbb_vehicles,
public.kbb_models,public.kbb_model_years,public.kbb_makes,public.
application_claims_applications,public.daily_site_statistics,
public.
ltv_history_records,public.daily_loan_snapshots,public.pbu_progra
ms, public.products,public.product_types",
    "transform.source": "git@github.com:teamupstart/paas.git/projectid
/",
    "transform.logic": "public.vehicle_claims,public.kbb_vehicles.sql,
public.kbb_models,public.kbb_model_years.sql,public.kbb_makes.sql,
public.application_claims_applications.sql",
    }
    "column.blacklist":
"public.vehicle_claims.vin_pii_token,public.
vehicle_claims.co_owner_email_pii_token,public.vehicle_claims.
co_owner_first_name_pii_token,public.vehicle_claims.
co_owner_last_name_pii_token",
    "decimal.handling.mode": "double"
    "snapshot.mode": "${initial_only/never/exported}",
    "slot.stream.params":     "add-tables=public.vehicle_claims,public.
kbb_vehicles,public.kbb_models,public.kbb_model_years,
public.kbb_makes,
public.application_claims_applications,public.daily_site_statistics,
public.ltv_history_records,public.daily_loan_snapshots,public.
pbu_programs,public.products,public.product_types",
    "heartbeat.interval.ms": "1000",
    "producer.acks": "all"
}.
```

What is claimed is:

1. A computer-implemented method executed using a first networked computer and comprising:

receiving a digitally stored workflow pattern that specifies at least an input data source, a data transformation process, an output data destination, a data quality assertion and a data quality source; the workflow pattern comprising a structured plurality of name declarations and value specifications that are human readable and machine readable; the data transformation process specified in the workflow pattern including one or more references to processing logic, a processing logic source outside the workflow pattern at which the processing logic is stored, and one or more available process engines that are capable of processing the processing logic;

machine parsing the workflow pattern and dividing the workflow pattern into a plurality of execution units, each execution unit being associated with a particular process engine among the one or more available process engines;

accessing the input data source specified in the workflow pattern and loading at least a portion of data from the input data source into main memory;

accessing the processing logic source at a second networked computer and loading a copy of the processing logic specified in the workflow pattern from the second networked computer;

for each of the execution units, selecting a particular process engine among the plurality of available process engines, calling the particular process engine, programmatically providing access to the portion of data and the copy of the processing logic, and receiving output data that has been created by the particular process engine after transforming the portion of data;

translating the data quality assertion into a data quality request and automatically forwarding the data quality request to the data quality source at a third computer, the data quality request comprising the data quality assertion, and receiving a response to the request that specifies whether the output data conforms to the data quality assertion.

2. The method of claim 1, the data quality assertion comprising an SQL query-based data quality assertion.

3. The method of claim 1, the data quality source comprising any of AMAZON AWS ATHENA interactive query service or GREAT EXPECTATIONS data quality service.

4. The method of claim 1, further comprising transmitting one or more alerts or notifications in the response to one or more of a log file, a governance metadata database, or an external logging service.

5. The method of claim 1, further comprising accessing the output data destination and storing the output data at the output data destination.

6. The method of claim 1, the workflow pattern specifying two or more workflows, each of the workflows specifying at least a particular input data source, a particular data transformation process, and a particular output data destination, in which the particular output destination of a first workflow among the two or more workflows references the particular data input of the second workflow among the two or more workflows, the first workflow and second workflow thereby being cross-referential; the method further comprising storing the output data associated with the first workflow transiently for use as input to the second workflow.

7. The method of claim 1, further comprising writing a message to an outbound event queue to report completion of the data transformations and to specify zero or more exceptions, errors, or notifications that have been received from external services.

8. The method of claim 1, further comprising receiving the digitally stored workflow pattern that specifies the input data source as a network path to a partition of a data storage system and a source connector that specifies an input interface which is programmed to interoperate with the data storage system.

9. The method of claim 8, the data storage system comprising any of AMAZON S3 data storage, AMAZON REDSHIFT data storage, or POSTGRES data storage databases.

10. The method of claim 1, further comprising receiving the digitally stored workflow pattern that specifies the data transformation process as a process type associated in the workflow pattern with the processing logic source outside the workflow pattern at which the processing logic is stored and with the one or more available process engines.

11. The method of claim 10, the process type specifying a SPARKSQL service packaged job.

12. The method of claim 1, further comprising receiving the digitally stored workflow pattern that specifies the output data destination as an association of specifications of: a network path to a relational database system, warehouse database, or topic in an APACHE KAFKA distributed event store system; a sink connector that specifies an output interface which is programmed to interoperate with the system of the network path; and a queue identifier of an outbound message queue; the method further comprising writing a completion message to the outbound message queue specified by the queue identifier.

13. The method of claim 12, further comprising:
receiving, in association with the output data that has been created by the particular process engine after transforming the portion of data, one or more exception messages that specify one or more exceptions, errors, or notifications arising from the transforming;
writing, as part of the completion message, message content of the one or more exception messages.

14. A first networked computer comprising one or more processors that are communicatively coupled to one or more non-transitory computer-readable storage media storing one or more sequences of instructions which, when executed using the one or more processors, cause the one or more processors to execute:
receiving a digitally stored workflow pattern that specifies at least an input data source, a data transformation process, an output data destination, a data quality assertion and a data quality source; the workflow pattern comprising a structured plurality of name declarations and value specifications that are human readable and machine readable; the data transformation process specified in the workflow pattern including one or more references to processing logic, a processing logic source outside the workflow pattern at which the processing logic is stored, and one or more available process engines that are capable of processing the processing logic;
machine parsing the workflow pattern and dividing the workflow pattern into a plurality of execution units, each execution unit being associated with a particular process engine among the one or more available process engines;
accessing the input data source specified in the workflow pattern and loading at least a portion of data from the input data source into main memory;
accessing the processing logic source at a second networked computer and loading a copy of the processing logic specified in the workflow pattern from the second networked computer;
for each of the execution units, selecting a particular process engine among the plurality of available process engines, calling the particular process engine, programmatically providing access to the portion of data and the copy of the processing logic, and receiving output data that has been created by the particular process engine after transforming the portion of data;
translating the data quality assertion into a data quality request and automatically forwarding the data quality request to the data quality source at a third computer, the data quality request comprising the data quality assertion, and receiving a response to the request that specifies whether the output data conforms to the data quality assertion.

15. The computer of claim 14, the data quality assertion comprising an SQL query-based data quality assertion.

16. The computer of claim 14, the data quality source comprising any of AMAZON AWS ATHENA interactive query service or GREAT EXPECTATIONS data quality service.

17. The computer of claim 14, further comprising sequences of instructions which when executed using the one or more processors cause the one or more processors to execute transmitting one or more alerts or notifications in the response to one or more of a log file, a governance metadata database, or an external logging service.

18. The computer of claim 14, further comprising sequences of instructions which when executed using the one or more processors cause the one or more processors to execute accessing the output data destination and storing the output data at the output data destination.

19. The computer of claim 14, the workflow pattern specifying two or more workflows, each of the workflows specifying at least a particular input data source, a particular data transformation process, and a particular output data destination, in which the particular output destination of a first workflow among the two or more workflows references the particular data input of the second workflow among the two or more workflows, the first workflow and second workflow thereby being cross-referential; the computer further comprising storing the output data associated with the first workflow transiently for use as input to the second workflow.

20. The computer of claim 14, further comprising sequences of instructions which when executed using the one or more processors cause the one or more processors to execute writing a message to an outbound event queue to report completion of the data transformations and to specify zero or more exceptions, errors, or notifications that have been received from external services.

21. The computer of claim 14, further comprising sequences of instructions which when executed using the one or more processors cause the one or more processors to execute receiving the digitally stored workflow pattern that specifies the input data source as a network path to a partition of a data storage system and a source connector that specifies an input interface which is programmed to interoperate with the data storage system.

22. The computer of claim 21, the data storage system comprising any of AMAZON S3 data storage, AMAZON REDSHIFT data storage, or POSTGRES data storage databases.

23. The computer of claim 14, further comprising sequences of instructions which when executed using the one or more processors cause the one or more processors to execute receiving the digitally stored workflow pattern that specifies the data transformation process as a process type associated in the workflow pattern with the processing logic source outside the workflow pattern at which the processing logic is stored and with the one or more available process engines.

24. The computer of claim 23, the process type specifying a SPARKSQL service packaged job.

25. The computer of claim 14, further comprising sequences of instructions which when executed using the one or more processors cause the one or more processors to execute receiving the digitally stored workflow pattern that specifies the output data destination as an association of specifications of: a network path to a relational database system, warehouse database, or topic in an APACHE KAFKA distributed event store system; a sink connector that specifies an output interface that is programmed to interoperate with the system of the network path; and a queue identifier of an outbound message queue; the computer further comprising writing a completion message to the outbound message queue specified by the queue identifier.

26. The computer of claim 25, further comprising sequences of instructions which when executed using the one or more processors cause the one or more processors to execute:
receiving, in association with the output data that has been created by the particular process engine after transforming the portion of data, one or more exception messages that specify one or more exceptions, errors, or notifications arising from the transforming;
writing, as part of the completion message, message content of the one or more exception messages.

* * * * *